United States Patent [19]
Hirabayashi

[11] Patent Number: 6,014,463
[45] Date of Patent: *Jan. 11, 2000

[54] IMAGE PROCESSING APPARATUS AND METHOD

[75] Inventor: Yasuji Hirabayashi, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/645,590

[22] Filed: May 14, 1996

[30] Foreign Application Priority Data

May 16, 1995 [JP] Japan ................................ 7-117201
May 16, 1995 [JP] Japan ................................ 7-117202

[51] Int. Cl.[7] .................................................. G06K 9/36
[52] U.S. Cl. ..................... 382/232; 382/236; 382/238; 348/409; 358/430
[58] Field of Search .................................. 382/232, 238, 382/242–245, 236; 368/394, 409; 358/261.2, 430

[56] References Cited

U.S. PATENT DOCUMENTS

| 4,750,212 | 6/1988 | Yokomizo ............................... | 382/245 |
| 4,809,350 | 2/1989 | Shimoni et al. ........................ | 382/238 |
| 4,941,045 | 7/1990 | Birch ....................................... | 348/409 |
| 5,086,487 | 2/1992 | Katayama et al. ..................... | 382/56 |
| 5,138,672 | 8/1992 | Hirabayashi et al. ................. | 382/54 |
| 5,524,064 | 6/1996 | Oddou et al. .......................... | 382/242 |

OTHER PUBLICATIONS

"Predictive Quantizing of Television Signals", Robert E. Graham, IRE Wescon Convention Record, vol. 2, Aug. 19–22, 1958, pp. 147–157, XP002051791.

"DPCM Picture coding with adaptive Prediction", W. Zachunke, IEEE Transactions On Communications, vol. 25, No. 11, Nov. 1977, pp. 1295–1301, XP002039929.

"Adaptive Differential Coding of Picture Signals Based on Local Contour Prediction", P. Cohen et al., National Communications Teleconference, 1976 pp. 6.1–1–6.1–5, XP002039931.

"Ein Never adaptive Prädiktor Für Die DPCM codierung Von Fernsehsignalen", C. Zhang, Frequenz, vol. 36, No. 6, Jun. 1982, Berlin pp. 162–168, XP002039932.

"Lossless Image Compression By Two–Dimensional Linear Prediction with Variable Coefficients", Nobutaka Kuroki, et al., IEEE Transactions on Fundamentals of Electronics, Communications and Computer Science, Jul. 1992, vol. E75–A, No. 7, XP000311782, pp. 882–889.

"Lossless Hierarchical Storage of Images", P. Piscaglia, et al., European Transactions on Telecommunications and Related Technologies, vol. 6, No. 3, May 1, 1995, pp. 267–274, XP000527580.

*Primary Examiner*—Jose L. Couso
*Assistant Examiner*—Anh Hong Do
*Attorney, Agent, or Firm*—Fitzpatrick, Cella, Harper & Scinto

[57] ABSTRACT

An image processor includes a forming unit which measures a feature of a first image and a feature of a second image for a plurality of pixels other than an encode objective pixel, thereby forming a first measurement result and a second measurement result, respectively. An encoder determines an encoding method of the encode objective pixel on the basis of a plurality of the first measurement results and a plurality of the second measurement results, and encodes by using the determined encoding method.

15 Claims, 6 Drawing Sheets

ENCODE OBJECTIVE PIXEL

ENCODE OBJECTIVE PIXEL

IMAGE PROCESSING APPARATUS AND METHOD

BACKGROUND OF THE INVENTION

1. Field of the Invention

The invention relates to an image processing apparatus and method for encoding and decoding image data.

2. Related Background Art

Hitherto, a DPCM (Differential Pulse Code Modulation) is widely known as a reversible encoding system of a multi-value image. According to a general encoding by DPCM, a prediction value (plane prediction) of an encode objective pixel is calculated by using encoded pixels existing around the encode objective pixel, namely, a left pixel (referred to as "a"), an upper pixel (likewise, "b"), and a left oblique pixel (likewise, "c") on the basis of, for example, an equation (a+b−c), and a difference between the prediction value and an encode objective pixel value is encoded.

Generally, since many portions of the image are formed by a monotonous luminance inclination, almost of the portion of the encode objective pixel is accurately predicted by a prediction of the foregoing encode objective pixel and is encoded.

However, in a high frequency portion in the pixel, namely, in an edge portion or a thin line portion, a large prediction error obviously occurs. In such a portion, a one-dimensional prediction in the direction of an edge or the extending direction is suitable instead of the plane prediction.

As mentioned above, the optimum prediction method differs depending on a nature in the pixel. Although the optimum predicting direction differs for each pixel, in the case where a user actually tries to perform the encoding, since additional information indicating which prediction method is used is added, encoding efficiency deteriorates.

As mentioned above, hitherto, there is a problem such that a prediction method of commonly efficiently encoding for both of a portion in which a pixel value has a gentle inclination and an edge portion or a thin line portion doesn't exist.

There is also a problem such that when performing a prediction encoding by selectively using a plurality of prediction methods, the additional information to indicate which prediction method is selected is necessary and the encoding efficiency is low.

SUMMARY OF THE INVENTION

To solve the above problems, therefore, it is an object of the invention to perform an efficient encoding independent of the nature of an image.

Another object of the invention is to provide an image processing apparatus and method which don't need additional information indicative of a prediction method of a pixel value.

To accomplish the above objects, according to a preferred embodiment of the invention, there is provided an image processing apparatus comprising: forming means for measuring characteristics of first and second images for a plurality of pixels other than an encode objective pixel, thereby forming first and second measurement results, respectively; and encoding means for determining an encoding method of the encode objective pixel on the basis of a plurality of first measurement results and a plurality of second measurement results and for encoding by using the determined encoding method.

The above and other objects and features of the present invention will become apparent from the following detailed description and the appended claims with reference to the accompanying drawings.

BRIEF DESCRIPTION OF THE DRAWINGS

FIGS. 9A to 9D are diagrams for describing the case where there are peripheral pixels which cannot be referred to.

DETAILED DESCRIPTION OF THE PREFERRED EMBODIMENTS

[First embodiment]

Figure 1A:
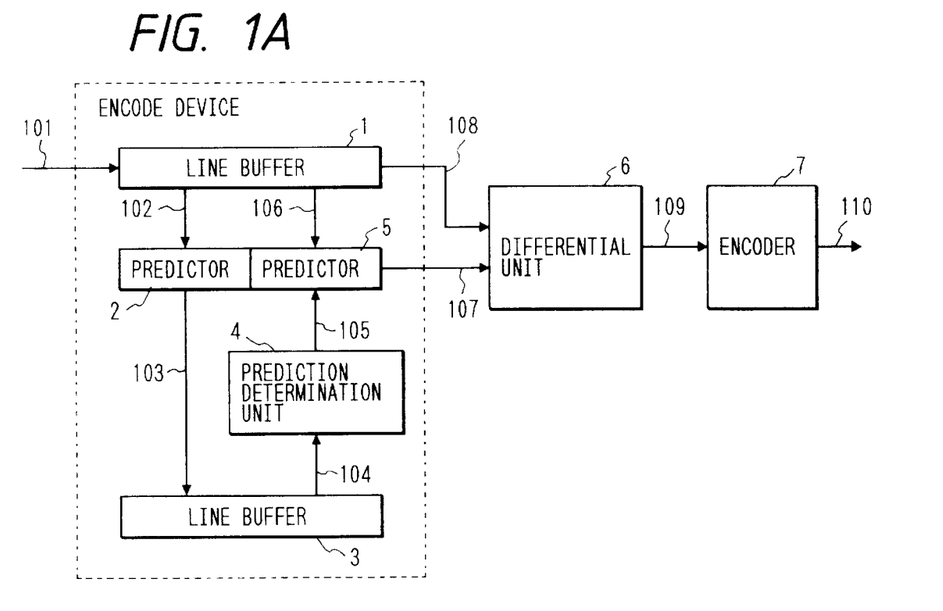
FIGS. 1A and 1B are diagrams showing an image encoding apparatus and a decoding apparatus according to a first embodiment.
Figure 1B:
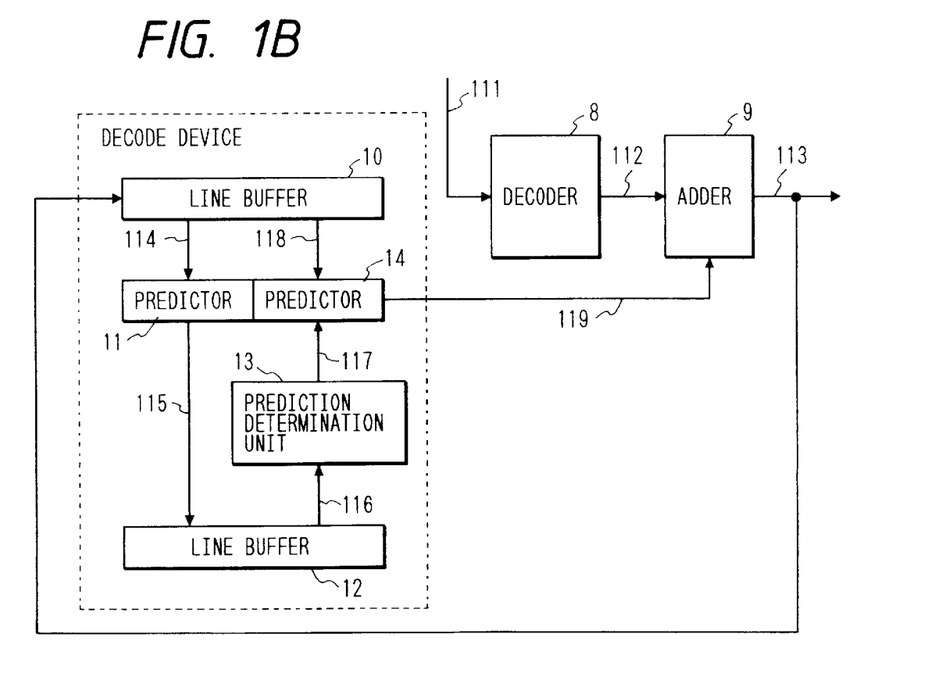

FIGS. 1A and 1B are block diagrams of a multi-value image encoding and decoding apparatus according to the first embodiment of the invention.

The encoding apparatus is first described.

In FIG. 1A, reference numeral 1 denotes a line buffer for holding an original image of an amount corresponding to three lines as an image width; 2 a predictor; and 3 a line buffer of three lines similar to the line buffer 1. The line buffer 3 stores data of a prediction result formed by the predictor 2. Reference numeral 4 denotes a prediction determination unit for determining a prediction method for an encode objective pixel with reference to the prediction result stored in the line buffer 3. Reference numeral 5 denotes a predictor similar to the predictor 2. The predictor 5 differs from the predictor 2 with respect to a point that the predictor 2 tries all of the prediction methods, and the predictor 5 only executes the prediction instructed by the prediction determination unit 4.

Reference numeral 6 denotes a differential unit for obtaining a difference between the encode objective pixel and the prediction value. Reference numeral 7 denotes an encoder for allocating a code to a differential value and outputting the allocated code.

The entire operation on the encoding side is described with reference to FIG. 1A.

A path from 101 to 103 via 102 is a system for only performing the prediction and it is sufficient that a predicting process until the pixel that is one-pixel preceding to the encode objective pixel has been finished at the time of the encoding and the process can also be executed at a speed higher than the speed for processing the one pixel.

Figure 4:
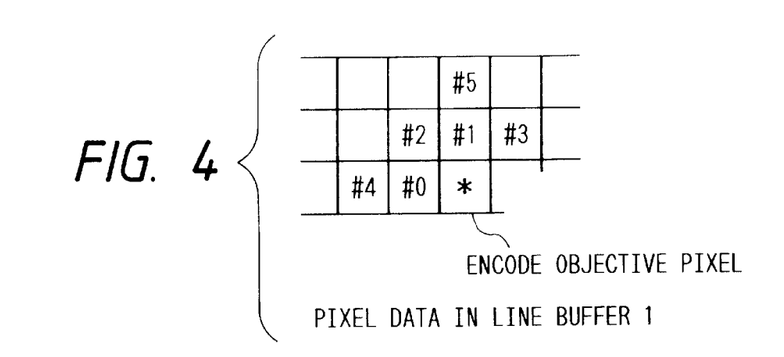
FIG. 4 is a diagram which is used for describing a predictor 5 in FIG. 1A.

First, the image data of an amount corresponding to three lines of the image data that is inputted through the path 101 is stored into the line buffer 1. The bottom line among the three lines is the encoding line and the two upper lines are used for reference. FIG. 4 shows reference pixels in the lines for reference which are used in the embodiment.

With respect to each reference pixel which is referred to when the encode objective pixel is encoded, the predictor 2 executes six kinds of predictions (correlation measurement of the pixel values), which will be described hereinlater, by using the peripheral pixels of each reference pixel. For each prediction, the predictor 2 generates "1" when the prediction error is smaller than a predetermined value and generates "0" when the prediction error is larger than the predetermined value. The resultant value is written into the line buffer 3. Thus, the prediction result of six bits is generated for one pixel.

When determining the prediction method of the encode objective pixel value upon encoding, the prediction results at the positions corresponding to six peripheral pixels (encoded pixels which were subjected to the above predicting process) of the encode objective pixel are sent from the line buffer 3 to the prediction determination unit 4.

The prediction determination unit 4 uses the prediction results of the peripheral pixels in the determination of a prediction method, which is described hereinlater, thereby determining which one of the six kinds of prediction methods is used. The prediction determination unit 4 outputs information indicative of the determined prediction method to the predictor 5.

On the basis of the information inputted from the prediction determination unit 4, the predictor 5 generates one prediction value by referring to the peripheral pixels of the encode objective pixel in the line buffer 1 through a data line 106 and outputs the prediction value to the differential unit 6 through a data line 107.

The differential unit 6 forms a differential value by subtracting the prediction value inputted through the data line 107 from the encode objective pixel value inputted through a data line 108 and outputs the differential value to the encoder 7 through a data line 109.

The encoder 7 Huffman encodes the differential value and outputs the encoded value via a data line 110. The entire operation has been described above.

The prediction method in the predictor 2 will now be described in detail with reference to FIG. 2.

Figure 2:
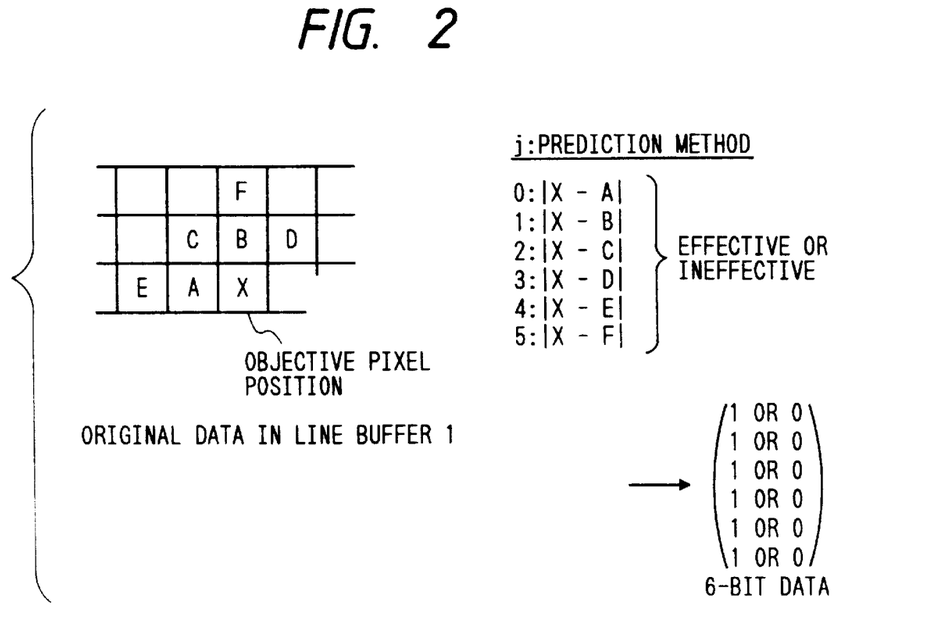
FIG. 2 is a diagram which is used for describing a predictor 2 in FIG. 1A.

As shown in FIG. 2, the pixel values of the objective pixel in the line buffer 1 and the six peripheral pixels (A to F) of the objective pixel are used. In this instance, when the absolute value of the difference between the objective pixel and each of the six peripheral pixels is equal to or less than 5 (it is assumed that a dynamic range of the pixel lies within a range from 0 to 255), it is judged to be "effective", so that the prediction result value is set to 1. When the absolute value is larger than 5, it is judged to be "ineffective", so that the prediction result value is set to 0.

Thus, the prediction result value of six bits is generated for each objective pixel. The 6-bit data is written into a memory location in the line memory 3 corresponding to the objective pixel position.

A method of determining a prediction method in the prediction determination unit 4 is described in detail with reference to FIG. 3.

Figure 3:
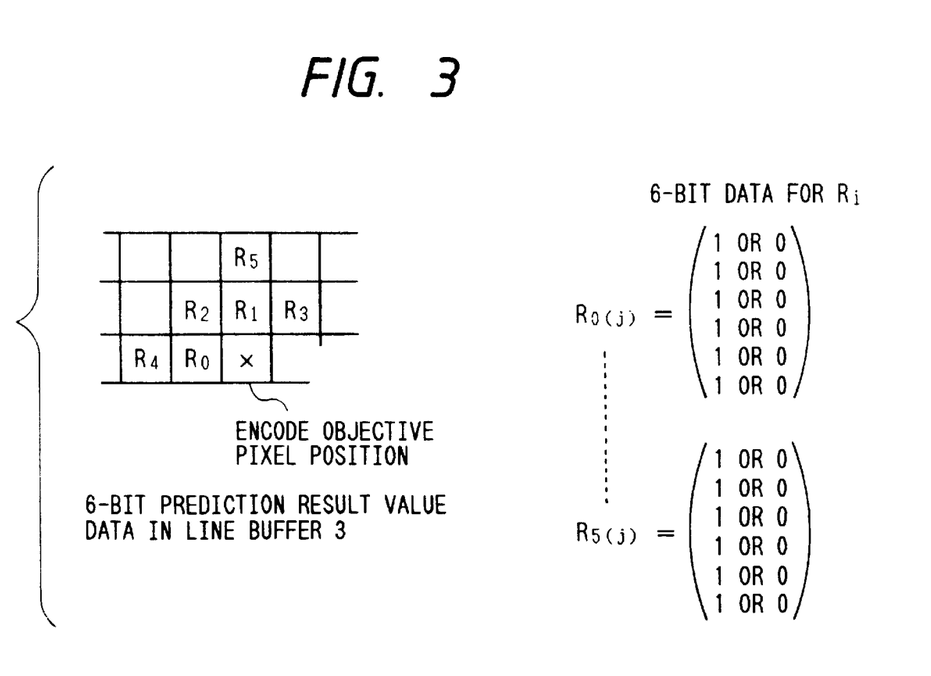
FIG. 3 is a diagram which is used for describing a prediction determination unit 4 in FIG. 1A.

As shown in FIG. 3, the prediction results of the six peripheral pixels at the positions corresponding to the encode pixels in the line buffer 3 (corresponding to the positions of A to F when the encode objective pixel is set to the objective pixel) are used. The prediction results are referred to as $R_0$ to $R_5$.

Each of the prediction results $R_0$ to $R_5$ is the data of six bits shown in FIG. 2 and generated at the time of the predicting process of the predictor 2.

It is now assumed that the prediction result value of one bit indicating effective/ineffective corresponding to the j-th prediction method of $R_i$ (i=0 to 5) corresponding to the six peripheral pixels of the encode objective pixel is set to $R_i(j)$, an evaluation value for the j-th prediction method in the region of $R_0$ to $R_5$ is set to S(j). S(j) is defined as follows.

$$S(j) = \sum_{i=0}^{5} C_{ij} \times R_i(j) \bigg|_{\substack{C_{ij}=1 \ (i \neq j) \\ C_{ij}=P \ (i=j)}}$$

where, P denotes a direction weight parameter and P=5 in the embodiment. The direction weight parameter P is used to raise a detecting precision of a pixel correlation by paying importance to $R_i$ corresponding to a certain pixel when a pixel correlation between the encode objective pixel and the certain pixel is detected by using $R_i$ of the six peripheral pixels. In this instance, j which gives the maximum value of S(j) is set to an index of the prediction method. The prediction determination unit 4 outputs this value to the predictor 5.

That is, the above equation is an equation to measure the overall correlation among the pixel values with respect to regions #0 to #5 in FIG. 4. The correlation among the pixel values of the pixels around the encode objective pixel can be measured.

The operation of the predictor 5 will now be described in detail with reference to FIG. 4. FIG. 4 shows a state of the encode objective pixel and its peripheral pixels in the line buffer 1.

The predictor 5 outputs a prediction value in accordance with the index inputted from the prediction determination unit 4. For example, when the index j=0 is inputted, the value of #0 as a prediction value by the zeroth prediction method is outputted. This value is supplied to the differential unit 6.

The decoding apparatus is now described with reference to FIG. 1B.

In FIG. 1B, reference numeral 8 denotes a decoder and 9 indicates an adder. A system of component elements 10 to 14 has a construction similar to the system of the component elements 1 to 5 in FIG. 1A.

The encoded data outputted from the encoder 7 in FIG. 1A is inputted to the decoder 8 via a data line 111 and is decoded. The decoded differential value data is added by the adder 9 to a prediction value outputted from a predictor 14, which will be described hereinlater. The addition value is outputted as reproduction data through a data line 113.

The reproduced decoded data is stored into a line buffer 10.

In a circuit from a predictor 11 to the predictor 14, the operations similar to those on the encoding apparatus side are executed. A prediction value of a decode objective pixel is outputted from the predictor 14 in a manner similar to the encoding apparatus side. The prediction value and the foregoing differential value data are added by the adder 9.

The reference pixel regions #0 to #5 which are used for the prediction upon encoding in the above embodiment are not limited to the peripheral pixels of the encode objective pixel, and can also be applied to a case such that the pixels of another picture plane is used as reference pixels. For example, an encoding method of the encode objective pixel can also be predicted by using the pixels in a picture plane which is displayed at different times in a moving picture. As for the encoding method, any one of a binary encoding and a multi-value encoding can be used. For example, it can be also applied to a binary encoding of a JBIG system.

According to the embodiment as mentioned above, the prediction method of each pixel is adaptively switched. Moreover, when determining the prediction method, since the peripheral pixels which were encoded are used without using the encode objective pixel, the additional information indicative of the prediction method is unnecessary. Thus, an efficient encoding is performed.

The evaluating method used in the prediction determination unit 4 is very effective for prediction of an edge or a diagram and further raises an encoding efficiency of the encoding method of the embodiment.

[Second embodiment]

According to the second embodiment, attention is newly paid to a fact that a pixel value prediction along a contour line on a luminance curved surface is most efficient for both of a smooth curved surface in an image and an edge or a thin line, a contour line including the encode objective pixel is determined, and a prediction encoding is performed along the contour line.

To accomplish the above prediction encoding, a direction having the largest luminance inclination is first searched from the encode objective pixel.

Since the contour line perpendicularly crosses the steepest luminance inclination, by searching such a contour line, the direction of the contour line is specified.

The reason why the contour line direction is not directly searched is now described hereinbelow. In the direction near the contour line, all of the luminance inclinations are small and the direction of the true contour line is hidden by noise components on the image. On the other hand, according to the method of obtaining the steepest inclination, since a power of a low frequency having a large inclination is larger than a power of noise, there is an advantage such that the steepest inclination direction is relatively easily or precisely known.

The second embodiment is characterized by obtaining the prediction value in the contour line direction obtained as mentioned above and an average value of a plurality of pixels in the contour line direction is used as a prediction value of the encode objective pixel. Therefore, distribution of the noise decreases, entropy of a prediction error decreases, and encoding efficiency is improved. The embodiment is described in detail hereinbelow.

Figure 5:
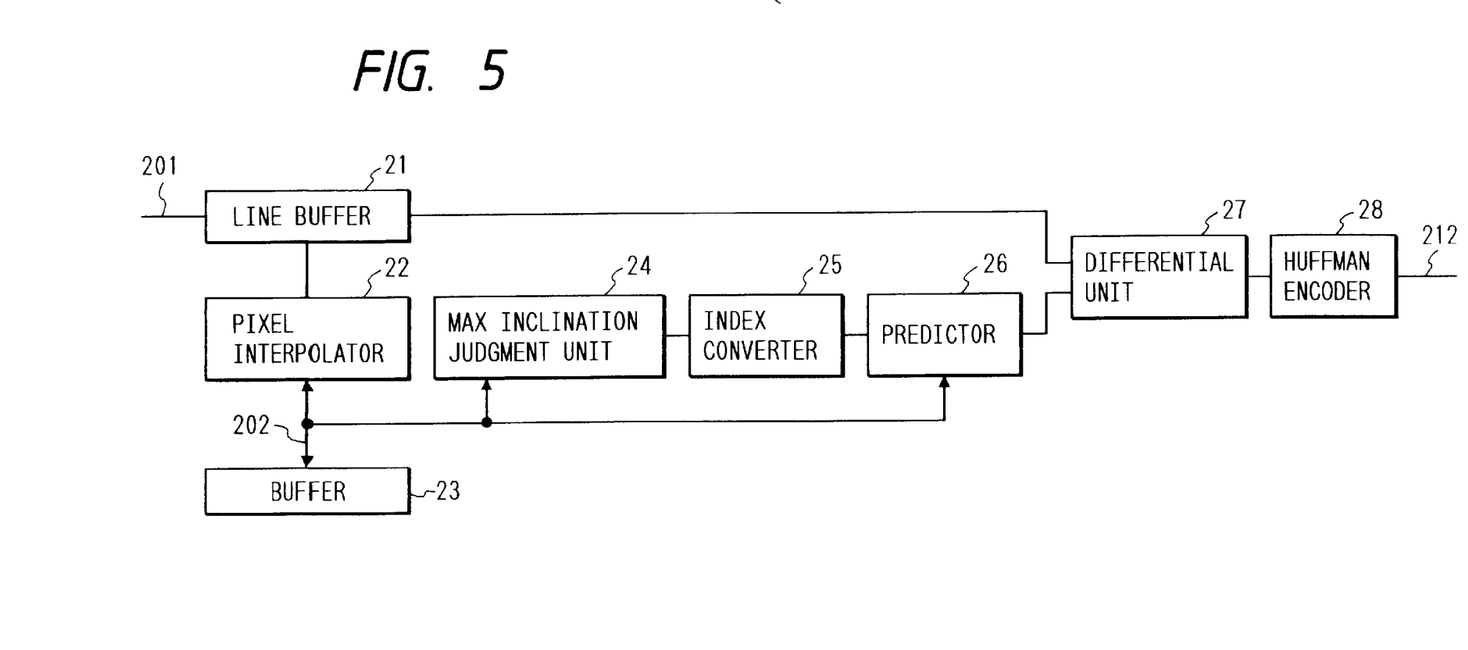
FIG. 5 is a block diagram of the image encoding apparatus of the second embodiment.

FIG. 5 shows an entire block diagram of a reversible encoding apparatus of a multi-value image according to an embodiment of the invention.

In FIG. 5, reference numeral 21 denotes a line buffer for storing one line including the encode objective pixel and four lines preceding such a line. The line buffer 21 is used when referring to the peripheral pixels of the encode objective pixel.

Reference numeral 22 denotes a pixel interpolator. On the assumption that there is a pixel between the encode objective pixel and the peripheral pixels of the encode pixel, the pixel interpolator 22 obtains a value of such a pixel.

The value of the pixel interpolated here and the values of the peripheral pixels of the encode objective pixel are stored into a buffer memory 23.

Reference numeral 24 denotes a maximum inclination judgment unit. The unit 24 selects the maximum luminance inclination for the directions (12 directions in the embodiment) which are radially directed to the outside from the encode objective pixel.

Reference numeral 25 denotes an index converter. For an index indicative of the maximum inclination direction judged by the maximum inclination judgment unit 24, the index converter 25 generates an index of the direction which perpendicularly crosses the maximum inclination direction.

Reference numeral 26 denotes a predictor for generating a prediction value by using the pixel in the contour line direction including the encode pixel or by using the interpolated pixel.

Reference numeral 27 denotes a differential unit for generating a differential value obtained by subtracting the prediction value from the encode objective pixel value. Reference numeral 28 denotes a Huffman encoder for providing a Huffman code for the differential value.

The entire operation is described with reference to FIG. 5.

The pixel data inputted from a data line 201 is stored into the line buffer 21. In the embodiment, it is assumed that a scanning line to be encoded and four preceding scanning lines which were encoded have been stored.

Figure 7:
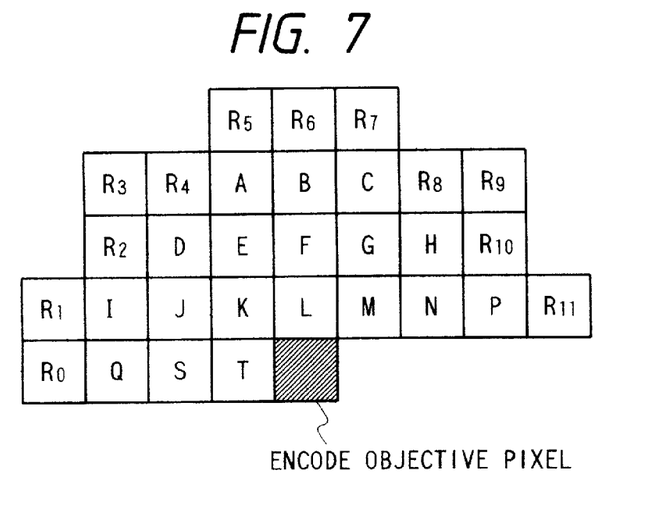
FIG. 7 is a diagram for describing peripheral pixels which are referred to in an image prediction of the second embodiment.
Figure 8:
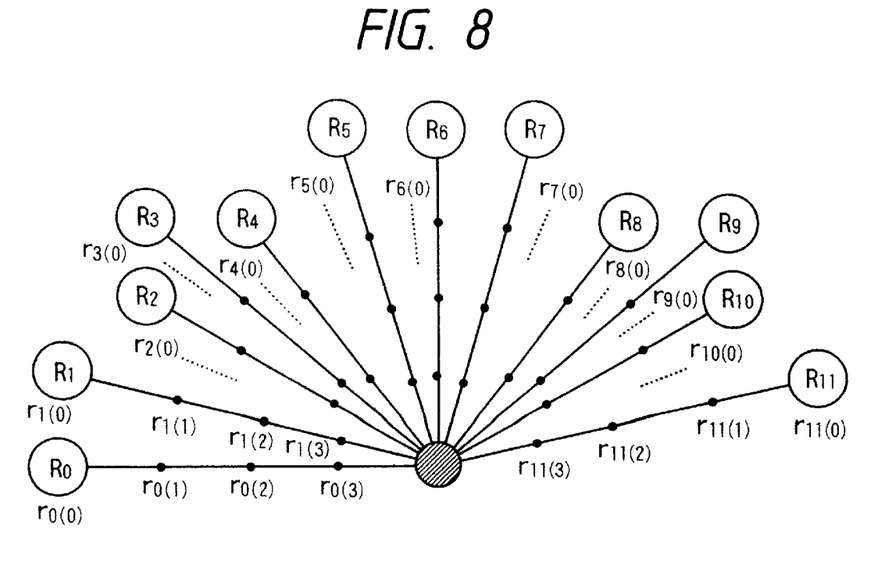
FIG. 8 is a diagram for describing the operation of the pixel interpolator 22 in FIG. 5.

The pixel interpolator 22 reads out the values of the peripheral pixels of $R_0$ to $E_{11}$ and A to T shown in FIG. 7 from the line buffer 21. By using those pixel values, as for the 42 pixels $r_0(j)$ to $r_{11}(j)/(j)$ corresponding to 12 directions shown in FIG. 8, the values of 0 to 3 or 0 to 2 are obtained by the following equations. Namely, the respective values are obtained by the following equations.

- $r_i (0) = R_i$ (edge point)
- $r_0 (1) = Q, r_0 (2) = S, r_0 (3) = T$
- $r_3 (1) = D, r_3 (2) = K$
- $r_6 (1) = B, r_6 (2) = F, r_6 (3) = L$
- $r_9 (1) = H, r_9 (2) = M$
- $r_1 (1) = (3I + Q)/4, r_1 (2) = (J + S)/2,$
  $r_1 (3) = (K + 3T)/4$
- $r_5 (1) = (3A + B)/4, r_5 (2) = (E + F)/2,$
  $r_5 (3) = (K + 3L)/4$
- $r_7 (1) = (3C + B)/4, r_7 (2) = (F + G)/2,$
  $r_7 (3) = (M + 3L)/4$
- $r_2 (1) = (2J + D)/3, r_2 (2) = (2K + T)/3$
- $r_4 (1) = (2E + D)/3, r_4 (2) = (2K + L)/3$
- $r_8 (1) = (2G + H)/3, r_8 (2) = (2M + L)/3$
- $r_{10} (1) = (2N + H)/3, r_{10} (2) = M$
- $r_{11} (1) = P, r_{11} (2) = N, r_{11} (3) = M$ In case of the encode objective pixel position in FIGS. 9A to 9D such that a part of the edge points cannot be referred to, only the directions of $R_i$ which can be referred to are used as targets of the directions which are used at a maximum inclination judgment, which are described hereinlater, and nothing is considered with respect to the other directions.

The pixel interpolator 22 performs a process such as interpolation or the like in accordance with the above equations. The above 42 pixel values are stored into the memory 23 through a bus 202.

The maximum inclination judgment unit 24 calculates an inclination by a method, which is described hereinlater, with reference to the 42 interpolation pixel values (reference pixel values) stored in the memory 23.

Now, assuming that the direction of $R_i$ is set to "direction i", the value of the inclination in the i direction is set to $G_i$. The number of interpolation pixels in the i direction assumes $N_i$ and $G_i$ is defined by the following equation.

$$G_i = \left| \sum_{j=0}^{N_i-2} H_i \{r_i(j) - r_i(j+1)\} / (N_i - 1) \right|$$

where, $H_i$ denotes a weight coefficient. In the embodiment, $H_i=1$.

The maximum inclination judgment unit 24 obtains $G_i$ with respect to i (=0 to 11) and outputs a value which gives maximum $G_i$ to the index converter 25.

Now, assuming that an input to the index converter 25 is set to Din and an output from the index converter is set to Dout, $$Dout=(Din+6)\% \ 12$$

where, % denotes a remainder arithmetic operation.

Thus, the index in the maximum inclination direction is converted into the index in the contour line direction and the encoding prediction method is determined.

In accordance with the index direction which is outputted from the index converter 25, the predictor 26 reads out the interpolation pixel values of the pixels existing in the index direction from the memory 23, calculates an average value of the pixel values of the number Nindex (index denotes the index in the contour line direction) as a prediction value, and outputs to the differential unit 27.

The differential unit 27 subtracts the prediction value of the encode objective pixel from the value of the encode objective pixel stored in the line buffer 21 and outputs a differential value to the Huffman encoder 28.

The Huffman encoder 28 performs a Huffman encoding to the differential value inputted from the differential unit 27 and outputs the encoded data to the decoding side through a data line 212.

Figure 6:
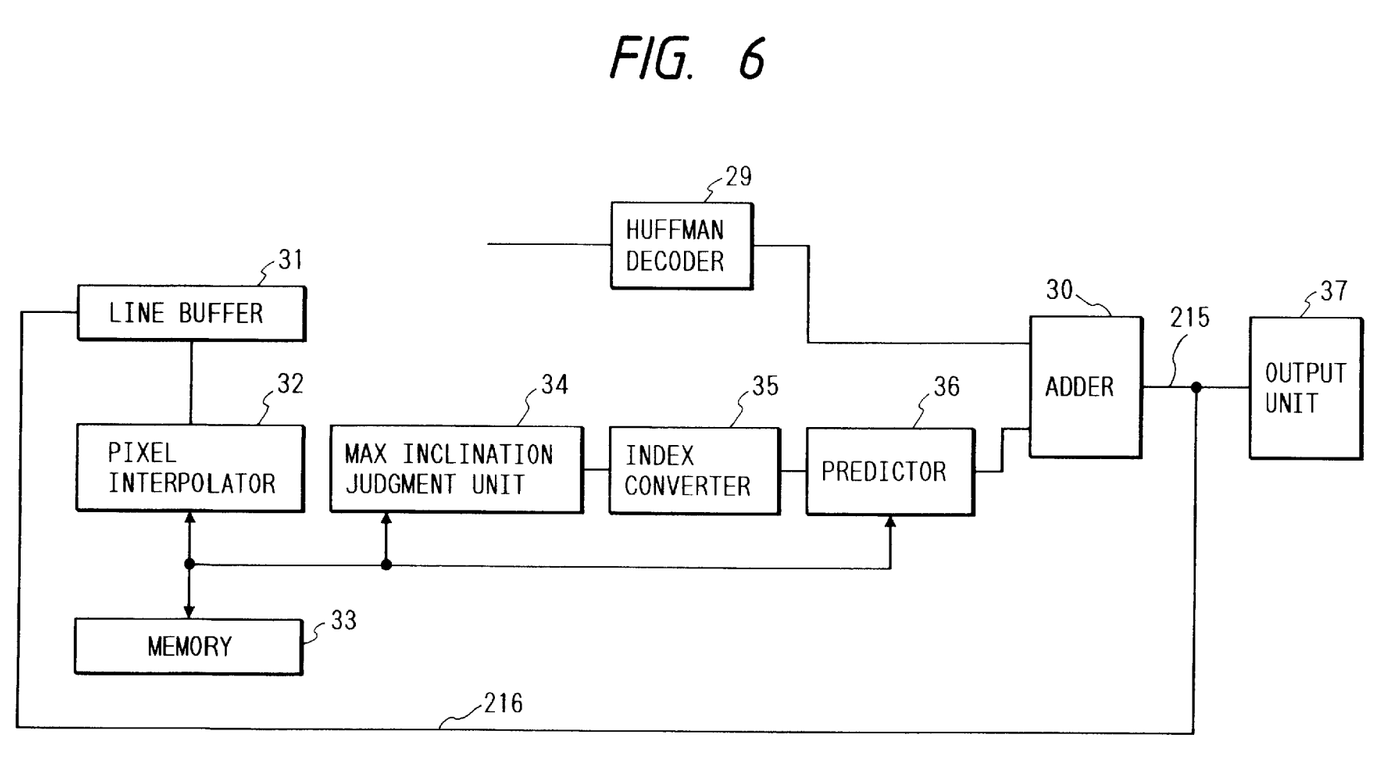
FIG. 6 is a block diagram of the image decoding apparatus of the second embodiment.

FIG. 6 shows an example of a block diagram of the decoding side. The encoded data outputted from the Huffman encoder 28 is decoded by a Huffman decoder 29 and is outputted as differential value data to an adder 30. Processes similar to those on the encoding side are executed with respect to a system from a line buffer 31 to a predictor 36. One line of the decode objective pixel and the decoded pixels of four lines preceding to such a line are stored into the line buffer 31. The same value as the output value of the predictor 26 is finally outputted from the predictor 36 to the adder 30 as a prediction value of the decode objective pixel.

The adder 30 adds the differential value data that is inputted from the Huffman decoder to the prediction value which is inputted from the predictor 36 and reproduces and outputs the addition result as a pixel value of the decode objective pixel. The pixel value which was reproduced and outputted is inputted to an output unit 37 through a data line 215 and is also stored through a data line 216 into the line buffer 31 as a decoded pixel value.

The determination of the encoding prediction method in the encoding method used in the above embodiment is performed by using the encoded peripheral pixels without using the encode objective pixel. Therefore, it can be commonly recognized on both of the encoding side and the decoding side, so that no additional information is needed.

As a Huffman encoding of the differential value according to the embodiment, another encoding method such as arithmetic encoding, Golowb-Rioe encoding, or the like can be substituted.

Figure 9A:
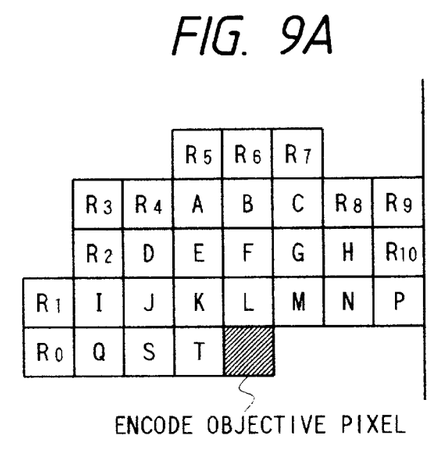
Figure 9B:
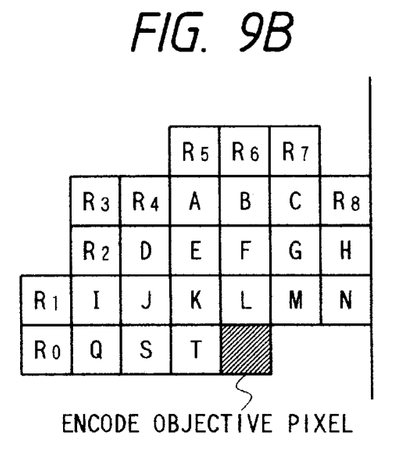
Figure 9C:
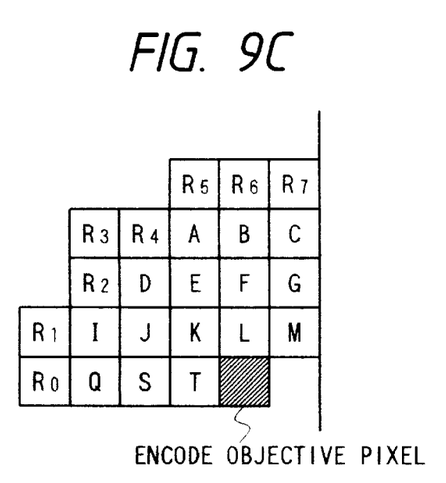
Figure 9D:
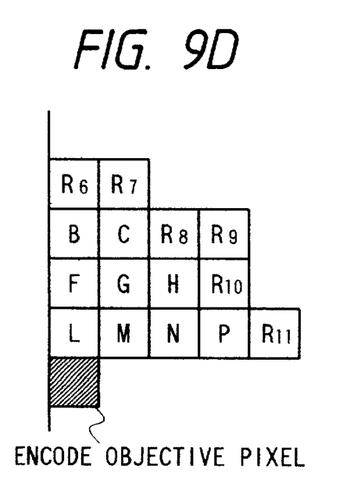

With respect to the position (the first pixel of the line) in FIG. 9D, it is also possible to control in a manner such that an actual pixel value is encoded and sent instead of the differential value and is decoded as an actual pixel value on the decoding side.

With respect to the first four lines of the image, it is also possible to control in a manner such that by setting the index that is determined by the predictor 26, the differential value between such an index and a preset direction is sent.

Further, in the above embodiment, although the maximum inclination direction has been detected and the prediction value has been determined by using the pixels in the direction that perpendicularly crosses the maximum inclination direction, another method whereby the representative direction among a plurality of directions having inclinations which are equal to or larger than a predetermined inclination is detected in place of the maximum inclination direction or the like can also be properly selected.

According to the first and second embodiments as mentioned above, it is possible to provide the encoding method whereby an efficient encoding which doesn't depend on the nature of the image can be performed and, further, the additional information indicative of the prediction method of the pixel value is unnecessary.

In the embodiment, although the encoding has been performed by the hardware, the invention is not limited to such an example, and the encoding can also be performed by software. With this method, the cost of the apparatus can be reduced. In the embodiment, since the prediction value is generated by a plurality of pixel values corresponding to the pixels existing in the contour line direction (irrespective of the method of judging the contour line direction, the prediction of the encode pixel is precisely performed). Such an advantage is an effect of the embodiment which is obtained even in the case of directly finding the contour line without indirectly searching the contour line.

The present invention is not limited to the foregoing embodiments, and many modifications and variations are possible within the spirit and scope of the appended claims of the invention.

What is claimed is:

1. An image processing method comprising the steps of:

generating a difference value between a value of a first pixel and a value of a peripheral pixel having a first correlative positional relationship for the first pixel, the first pixel being a peripheral pixel of an object pixel to be encoded;

generating a difference value between a value of the first pixel and a value of a peripheral pixel having a second correlative positional relationship for the first pixel;

generating a difference value between a value of the second pixel and a value of a peripheral pixel having the first correlative positional relationship for the second pixel, the second pixel being a peripheral pixel of the object pixel to be encoded;

generating a difference value between a value of the second pixel and a value of a peripheral pixel having the second correlative positional relationship for the second pixel;

predicting similarity between the value of the object pixel to be encoded and the value of the pixel having the first correlative positional relationship for the object pixel to be encoded, and similarity between the value of the object pixel to be encoded and the value of the pixel having the second correlative positional relationship for the object pixel to be encoded, on the basis of at least the four difference values generated;

determining an encoding method of the object pixel to be encoded, according to a result obtained in said predicting step; and encoding the value of the object pixel to be encoded by using the determined encoding method.

2. An image processing apparatus comprising:

generating means for generating a difference value between a value of a first pixel and a value of a peripheral pixel having a first correlative positional relationship for the first pixel, the first pixel being a peripheral pixel of an object pixel to be encoded;

said generating means generating a difference value between a value of the first pixel and a value of a peripheral pixel having a second correlative positional relationship for the first pixel;

said generating means generating a difference value between a value of a second pixel and a value of a peripheral pixel having the first correlative positional relationship for the second pixel, the second pixel being a peripheral pixel of the object pixel to be encoded;

said generating means generating a difference value between a value of the second pixel and a value of a peripheral pixel having the second correlative positional relationship for the second pixel;

predicting means for predicting similarity between the value of the object pixel to be encoded and the value of the pixel having the first correlative positional relationship for the object pixel to be encoded, and similarity between the value of the object pixel to be encoded and the value of the pixel having the second correlative positional relationship for the object pixel to be encoded, on the basis of at least the four difference values generated;

determining means for determining an encoding method of the object pixel to be encoded, according to a result obtained by said predicting means; and encoding means for encoding the value of the object pixel to be encoded by using the determined encoding method.

3. An image processing method comprising the steps of:

generating a difference value between a value of a first pixel and a value of a peripheral pixel having a first correlative positional relationship for the first pixel, the first pixel being a peripheral pixel of on object pixel to be encoded;

generating a difference value between a value of the first pixel and a value of a peripheral pixel having a second correlative positional relations for the first pixel;

generating a difference value between a value of a second pixel and a value of a peripheral pixel having the first correlative positional relationship for the second pixel, the second pixel being a peripheral pixel of the object pixel to be encoded;

generating a difference value between a value of the second pixel and value of a peripheral pixel having the second correlative positional relationship for the second pixel;

generating a difference value between a value of a third pixel and a value of a peripheral pixel having the first correlative positional relationship for the third pixel, the third pixel being a peripheral pixel of the object pixel to be encoded;

generating a difference value between a value of the third pixel and a value of a peripheral pixel having the second correlative positional relationship for the third pixel;

predicting similarity between the value of the object pixel to be encoded and the value of the pixel having the first correlative positional relationship for the object pixel to be encoded, and similarity between the value of the object pixel to be encoded and the value of the pixel having the second correlative positional relationship for the object pixel to be encoded on the basis of the at least the four difference values generated;

determining an encoding method of the object pixel to be encoded according to a result obtained in said predicting step; and encoding the value of the object pixel to be encoded by using the determined encoding method.

4. An image processing apparatus comprising:

generating means for generating a difference value between a value of a first pixel and a value of a peripheral pixel having a first correlative positional relationship for the first pixel, the first pixel being a peripheral pixel of an object pixel to be encoded;

said generating means generating a difference value between a value of the first pixel and a value of a peripheral pixel having a second correlative positional relationship for the first pixel;

said generating means generating a difference value between a value of a second pixel and a value of a peripheral pixel having the first correlative positional relationship for the second pixel, the second pixel being a peripheral pixel of the object pixel to be encoded;

said generating means generating a difference value between a value of the second pixel and a value of a peripheral pixel having the second correlative positional relationship for the second pixel;

said generating means generating a difference value between a value of a third pixel and a value of a peripheral pixel having the first correlative positional relationship for the third pixel, the third pixel being a peripheral pixel of the object pixel to be encoded;

said generating means generating a difference value between a value of the third pixel and a value of a peripheral pixel having the second correlative positional relationship for the third pixel;

predicting means for predicating similarity between the value of the object pixel to be encoded and the value of the pixel having the first correlative positional relationship for the object pixel to be encoded, and similarity between the value of the object pixel to be encoded and the value of the pixel having the second correlative positional relationship for the object pixel to be encoded, on the basis of at least the six difference values generated;

determining means for encoding an encoding method of the object pixel to be encoded according to a result obtained by said predicting means; and encoding means for encoding the value of the object pixel to be encoded by using the determined encoding method.

5. An image processing method for encoding a value of an encoding object pixel, comprising the steps of:

detecting similarity between a value of a first pixel and a value of a peripheral pixel having a first correlative positional relationship for the first pixel, the first pixel being a peripheral pixel of the encoding object pixel;

detecting similarity between a value of the first pixel and a value of a peripheral pixel having a second correlative positional relationship for the first pixel;

detecting similarity between a value of a second pixel and a value of a peripheral pixel having the first correlative positional relationship for the second pixel, the second pixel being a peripheral pixel of the encoding object pixel;

detecting similarity between a value of the second pixel and a value of a peripheral pixel having the second correlative positional relationship for the second pixel;

determining whether the value of the encoding object pixel is to be encoded by using the value of the pixel having the first correlative positional relationship for the encoding object pixel, or is to be encoded by using the value of the pixel having the second correlative positional relationship for the encoding object pixel on the basis of at least the four similarity detected; and encoding the value of the encoding object pixel on the basis of a result obtained in said determining step.

6. An image processing apparatus for encoding a value of an encoding object pixel, comprising:

detecting means for detecting similarity between a value of a first pixel and a value of a peripheral pixel having a first correlative positional relationship for the first pixel, the first pixel being a peripheral pixel of the encoding object pixel;

said detecting means detecting similarity between a value of the first pixel and a value of a peripheral pixel having a second correlative positional relationship for the first pixel;

said detecting means detecting similarity between a value of a second pixel and a value of a peripheral pixel having the first correlative positional relationship for the second pixel, the second pixel being a peripheral pixel of the encoding object pixel;

said detecting means detecting similarity between a value of the second pixel and a value of a peripheral pixel having the second correlative positional relationship for the second pixel;

determining means for determining whether the value of the encoding object pixel is to be encoded by using the value of the pixel having the first correlative positional relationship for the encoding object pixel, or is to be encoded by using the value of the pixel having the second correlative positional relationship for the encoding object pixel on the basis of at least the four similarity detected; and encoding means for encoding the value of the encoding object pixel on the basis of a result obtained by said determining means.

7. An image processing method for encoding a value of an encoding object pixel, comprising the steps of:

detecting similarity between a value of a first pixel and a value of a peripheral pixel having a first correlative positional relationship for the first pixel, the first pixel being a peripheral pixel of the encoding object pixel;

detecting similarity between a value of the first pixel and a value of a peripheral pixel having a second correlative positional relationship for the first pixel;

detecting similarity between a value of a second pixel and a value of a peripheral pixel having the first correlative positional relationship for the second pixel, the second pixel being a peripheral pixel of the encoding object pixel;

detecting similarity between a value of the second pixel and a value of a peripheral pixel having the second correlative positional relationship for the second pixel;

predicting similarity between the value of the encoding object pixel and the value of the pixel having the first correlative positional relationship for the encoding object pixel, and similarity between the value of the encoding object pixel and the value of the pixel having the second correlative positional relationship for the encoding object pixel on the basis of the at least the four similarity detected;

determining an encoding method of, the encoding object pixel, according to a result obtained in said predicting step; and encoding the value of the encoding object pixel by using the determined encoding method.

8. A method according to claim 7, wherein the first pixel has the first correlative positional relationship for the encoding object pixel and the second pixel has the second correlative positional relationship for the encoding object pixel.

9. A method according to claim 7, wherein the encoding method includes at least a method for encoding the difference value between the value of the encoding object pixel and the value of the pixel having the first correlation positional relationship for the encoding object pixel and a method for encoding the difference value between the value of the encoding object pixel and the value of the pixel having the second correlative positional relationship for the encoding object pixel.

10. A method according to claim 7, wherein the first pixel and the second pixel are pixels which are encoded before encoding the encoding object pixel.

11. A method according to claim 7, wherein each similarity is represented by a bit indicating validity or invalidity.

12. A method according to claim 7 wherein the first correlation positional relationship and the second correlation positional relationship different from each other, and wherein each of the first correlation positional relationship and the second correlation positional relationship is one of a positional relationship neighboring upper or lower side, a positional relationship neighboring cross side and a positional relationship neighboring right or left side.

13. An image processing apparatus for encoding a value of an encoding object pixel, comprising:

detecting means for detecting similarity between a value of a first pixel and a value of a peripheral pixel having a first correlative positional relationship for the first pixel, the first pixel being a peripheral pixel of the encoding object pixel;

said detecting means detecting similarity between a value of the first pixel and a value of a peripheral pixel having a second correlative positional relationship for the first pixel;

said detecting means detecting similarity between a value of a second pixel and a value of a peripheral pixel having the first correlative positional relationship for the second pixel, the second pixel being a peripheral pixel of the encoding object pixel;

said detecting means detecting similarity between a value of the second pixel and a value of a peripheral pixel having the second correlative positional relationship for the second pixel;

predicting means for predicting similarity between the value of the encoding object pixel and the value of the pixel having the first correlative positional relationship for the encoding object pixel, and similarity between the value of the encoding object pixel and the value of the pixel having the second correlative positional relationship for the encoding object pixel on the basis of the at least the four similarity detected;

determining means for determining an encoding method of, the encoding object pixel, according to a result obtained by said predicting means; and encoding means for encoding the value of the encoding object pixel by using the determined encoding method.

14. An image processing method for encoding a value of an encoding object pixel, comprising the steps of:

detecting similarity between a value of a first pixel and a value of a peripheral pixel having a first correlative positional relationship for the first pixel, the first pixel being a peripheral pixel of the encoding object pixel;

detecting similarity between a value of the first pixel and a value of a peripheral pixel having a second correlative positional relationship for the first pixel;

detecting similarity between a value of a second pixel and a value of a peripheral pixel having the first correlative positional relationship for the second pixel, the second pixel being a peripheral pixel of the encoding object pixel;

detecting similarity between a value of the second pixel and a value of a peripheral pixel having the second correlative positional relationship for the second pixel;

predicting similarity between the value of the encoding object pixel and the value of the pixel having the first correlative positional relationship for the encoding object pixel, and similarity between the value of the encoding object pixel and the value of the pixel having the second correlative positional relationship for the encoding object pixel, on the basis of at least the four similarity detected;

determining an encoding method of the encoding object pixel, according to ta result obtained in said predicting step; and encoding the value of the encoding object pixel by using the determined encoding method.

15. An image processing apparatus for encoding a value of an encoding object pixel, comprising:

detecting means for detecting similarity between a value of a first pixel and a value of a peripheral pixel having a first correlative positional relationship for the first pixel, the first pixel being a peripheral pixel of the encoding object pixel;

said detecting means detecting similarity between a value of the first pixel and a value of a peripheral pixel having a second correlative positional relationship for the first pixel;

said detecting means detecting similarity between a value of a second pixel and a value of a peripheral pixel having the first correlative positional relationship for the second pixel, the second pixel being a peripheral pixel of the encoding object pixel;

said detecting means detecting similarity between a value of the second pixel and a value of a peripheral pixel having the second correlative positional relationship for the second pixel;

predicting means for predicting similarity between the value of the encoding object pixel and the value of the pixel having the first correlative positional relationship for the encoding object pixel, and similarity between the value of the encoding object pixel and the value of the pixel having the second correlative positional relationship for the encoding object pixel, on the basis of at least the four similarity detected;

determining means for determining an encoding method of the encoding object pixel, according to a result obtained by said predicting means; and encoding means for encoding the value of the encoding object pixel by using the determined encoding method.

* * * * *

UNITED STATES PATENT AND TRADEMARK OFFICE
CERTIFICATE OF CORRECTION

PATENT NO. : 6,014,463
DATED : January 11, 2000
INVENTOR(S) : Yasuji Hirabayashi It is certified that error appears in the above-identified patent and that said Letters Patent is hereby corrected as shown below:

Column 8,
Line 20, "the" (first occurrence) should be deleted.

Column 9,
Line 40, "on" should read --an--; and
Line 44, "relations" should read --relationship--.

Column 10,
Line 38, "predicating" should read --predicting--.

Column 11,
Line 10, "similarity" should read --similarities--; and
Line 41, "similarity" should read --similarities--.

Column 12,
Line 2, "the" (second occurrence) should be deleted;
Line 3, "similarity" should read --similarities;
Line 28, "different" should read --are different--;
Line 60, "the" (third occurrence) should be deleted; and
Line 61, "similarity" should read --similarities--.

UNITED STATES PATENT AND TRADEMARK OFFICE
CERTIFICATE OF CORRECTION

PATENT NO. : 6,014,463
DATED : January 11, 2000
INVENTOR(S) : Yasuji Hirabayashi It is certified that error appears in the above-identified patent and that said Letters Patent is hereby corrected as shown below:

Column 13,
Line 24, "similarity" should read --similarities--; and
Line 28, "ta" should read --a--.

Column 14,
Line 26, "similarity" should read --similarities--.

Signed and Sealed this

Seventh Day of August, 2001

*Attest:*

*Attesting Officer*

NICHOLAS P. GODICI
*Acting Director of the United States Patent and Trademark Office*